(12) United States Patent
Ohkuma et al.

(10) Patent No.: US 6,217,220 B1
(45) Date of Patent: Apr. 17, 2001

(54) ROLLING BEARING UNIT FOR ROAD WHEEL

(75) Inventors: Takeo Ohkuma; Hideo Ouchi, both of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/429,041

(22) Filed: Oct. 29, 1999

(30) Foreign Application Priority Data

Oct. 29, 1998 (JP) .................................................... 10-309007
Jun. 16, 1999 (JP) .................................................... 11-169450

(51) Int. Cl.⁷ ............................. F16C 33/78; B60B 27/00
(52) U.S. Cl. ...................... 384/489; 384/448; 384/477; 384/544; 301/108.1
(58) Field of Search ................................. 384/477, 480, 384/484–486, 488, 489, 448, 544, 589; 301/105.1, 108.1, 108.3

(56) References Cited

U.S. PATENT DOCUMENTS

| | | | |
|---|---|---|---|
| 3,589,747 | 6/1971 | Asberg . | |
| 3,944,305 | * 3/1976 | Asberg | ................. 384/485 X |
| 4,571,099 | * 2/1986 | Balken et al. | ............. 384/544 X |
| 5,011,233 | * 4/1991 | Nomura et al. | ............. 301/108.1 |
| 5,240,333 | 8/1993 | Hassiotis et al. . | |
| 5,803,617 | * 9/1998 | Ohnuki et al. | ............. 384/486 |
| 5,816,711 | * 10/1998 | Gingrich | .................. 384/488 |
| 6,012,986 | * 1/2000 | Guimbretiere | .......... 384/544 X |

* cited by examiner

Primary Examiner—Thomas R. Hannon
(74) Attorney, Agent, or Firm—Evenson, McKeown, Edwards & Lenahan, P.L.L.C.

(57) ABSTRACT

A hub (4) for supporting a non-driven road wheel has a hole section formed to have an opening in the central portion at either end of the hub. A tone wheel (19) is fitted onto the shoulder portion of an inner ring (5) fixed to the axially inner end of the hub 4, and has a function to work as a seal member, such that the opening at the axially inner end of the hole (8, 63a) is covered. In addition, a cap (27) is fitted into the axially outer end of the hub (4) to cover the opening at the axially outer end of the hole (8, 63b).

8 Claims, 12 Drawing Sheets

ROLLING BEARING UNIT FOR ROAD WHEEL

FIELD OF THE INVENTION

The rolling-bearing unit for a road wheel of this invention is used for rotatably supporting with reference to a suspension the non-driven wheels {rear wheels for a FF vehicle (front engine, front-wheel drive) and front wheels for a FR vehicle (front engine, rear-wheel drive) and for a RR vehicle (rear engine, rear-wheel drive)} that are supported by a suspended-type independent suspension of an automobile.

BACKGROUND OF THE INVENTION

In order to rotatably support with reference to the suspension the non-driven wheels that are supported by the suspended-type independent suspension for an automobile, various kinds of rolling-bearing units for road wheel have been used in which the outer ring and hub rotate freely by way of rolling members in combination.

In this kind of rolling-bearing unit for road wheel, the outer ring, which does not rotate even when in use, has a first installation flange around its outer peripheral surface for connecting it to the suspension, and an outer ring raceway around its inner peripheral surface.

In addition, the hub, which rotates when in use, has a second installation flange around its outer peripheral surface on a portion closer to the axially outer end (the term "axially outer" means the side toward the outside in the width direction of the automobile when installed in the automobile) and an inner ring raceway formed around its middle portion directly or by way of an inner ring.

Moreover, by placing the rolling members between the outer ring raceway and inner ring raceway so that they rotate freely, the road wheel that is fastened to the hub is supported rotatably with respect to the suspension to which the outer ring is fastened.

In the case of the rolling-bearing unit for road wheel used for supporting the non-driven wheels in this way, the hub does not particularly require a through hole that penetrates its center section and thus can be made solid.

On the other hand, in the case of a rolling-bearing unit for road wheel that is used for rotatably supporting the driven wheels {the front wheels for a FF vehicle, rear wheels for a FR and RR vehicle and all four wheels for a 4WD vehicle (four-wheel drive vehicle)} with respect to the suspension, it is necessary to connect the shaft of the constant velocity joint with the hub to which the road wheels are fastened. Accordingly, generally a through hole is formed in the hub through which the shaft is inserted.

Furthermore, as shown in FIG. 1, a rolling-bearing unit for road wheel used for supporting the non-driven wheels has been known and has actually been used. This construction uses common components for the rolling-bearing unit for road wheel for both the driven wheels and the non-driven wheels.

The outer ring 1, which does not rotate when installed in the vehicle and supported by the suspension, has a first installation flange 2 around its outer peripheral surface for supporting it by the suspension, and double rows of outer ring raceways 3 around its inner peripheral surface, respectively.

A hollow cylindrical-shaped hub 4 and inner ring 5 are located on the inside of the outer ring 1 and rotatable during use. Of these, the hub 4 has a second installation flange 6 around its outer peripheral surface on the axially outer end (left end in FIG. 1) for attaching it to the road wheel, and a first inner ring raceway 7a in its middle portion, as well as a through hole 8 that penetrates its center in the axial direction. Also, a second inner ring raceway 7b is formed around the outer peripheral surface of the inner ring 5, and the inner ring 5 is fitted around the outer peripheral surface on the axially inner end of the hub 4 (the term "axially inner" means is the side toward the center in the width direction when mounted on the automobile, the right in FIGS. 1 thru 14, and the left in FIG. 2).

A bolt 9 is inserted through the inside of the through hole 8, and a nut 10 is fastened to the tip end of this bolt 9 that sticks out from the axially outer end of the hub 4, and by tightening it securely, the hub 4 and inner ring 5 are held between the head 11 of the bolt 9 and the nut 10 such that the hub 4 and inner ring 5 are joined together as one body.

In addition, multiple rolling members (balls) 12 are placed between the outer ring raceways 3 and the inner ring raceways 7a, 7b such that they can roll freely.

Moreover, a short, cylindrical shaped cover 14 with a bottom, that is also referred to as a first seal member in the present specification, is formed by bending sheet metal and attached to the opening on the axially inner end of the outer ring 1.

Together with this, a seal ring 13, which is also referred to as a second seal member in this specification, is located between the opening edge on the axially outer end of the outer ring 1 and the outer peripheral surface in the middle portion of the hub 4. These seal members prevent foreign matter such as mud, dust, dirt and the like from getting inside the space 15 where the rolling members 12 are located, and they also prevent lubrication grease that is in this space 15 from leaking out.

When the rolling-bearing unit for road wheel that is constructed as described above is being used, the first installation flange 2 that is formed on the outer ring 1 is fastened to part of the suspension (not shown in the figures) and the second installation flange 6 that is formed around the hub 4 is fastened to the non-driven wheel (not shown in the figures).

When the rolling-bearing unit for road wheel supports the non-driven wheel as shown in FIG. 1, it is possible to make the hub common with the rolling-bearing unit which supports the driven wheel. In other words, as mentioned above, in the case of a general rolling-bearing unit for road wheel which supports the driven wheel, it is necessary to have a hole (this is generally a spline hole) through the center of the hub through which the constant velocity joint can pass.

As to this hole, with the construction shown in FIG. 1, there is a through hole 8 through the center of the hub 4, so that there is no need to make a separate hole in the hub because of the existence of this through hole 8. The through hole 8 in the hub 4 for the non-driven wheel can be used as is before forming a spline, and thus it is possible to keep down the rising costs that accompany the formation of a spline.

In the case of the construction shown in FIG. 1, since the opening on the axially inner end of the through hole 8 is sealed tight by the bolt 9 and nut 10, it is possible to prevent the lubrication grease in the space 15 from getting inside this through hole 8, and thus it is not necessary to increase the amount of grease used.

Moreover, a rolling-bearing unit for road wheel as shown in FIG. 2 has been disclosed in U.S. Pat. No. 3,589,747. In the case of this rolling-bearing unit for road wheel, a hollow, cylindrical shaped hub 4 and the inner ring 5, which is fitted around the hub 4 on the axially inner end (left side in FIG. 2), are supported on the inside of the outer ring 1 by a tapered roller bearing such that they can rotate freely with respect to the outer ring 1. Therefore, a pair of tapered concave shaped outer ring raceways 54 are formed around the inner peripheral surface on both ends in the axial direction of the outer ring 1 such that they are tapered in opposite directions. Moreover, tapered convex shaped inner ring raceways 55a, 55b are formed around the outer peripheral surface in the middle portion of the hub 4 and around the outer peripheral surface of the inner ring 5, respectively, such that they are tapered in opposite directions.

Also, multiple tapered rollers 56 are located between the outer ring raceways 54 and the inner ring raceways 55a, 55b such that they can roll freely.

Furthermore, in the case of the construction shown in the figure, in order to fasten the inner ring 5 to the axially inner end of the hub 4, a plastically deformed section 58 that sticks out in the radial direction toward the outside is formed on the axially inner end of the hub 4. The inner ring 5 is held between this plastically deformed section 58 and a stepped section 59 that is formed around the outer peripheral surface in the middle portion of the hub 4.

Moreover, a short, cylindrical-shaped cover 14 with a bottom, which is also referred to as a first seal member in this specification, is formed by pressing sheet metal and attached to the opening on the axially inner end of the outer ring 1. Together with this, a seal ring 13, that is also referred to as a second seal member in this specification, is placed between the opening on the axially outer end (right end in FIG. 2) of the outer ring 1 and the outer peripheral surface in the middle portion of the hub 4. Furthermore, a through hole 8 is formed such that it penetrates through the center of the hub 4 in the axial direction and a seal member 57 is attached to the inner peripheral surface of the axially inner end of the through hole 8 and this seal member 57 seals the axially inner end of the through hole 8.

In the case of the construction disclosed in U.S. Pat. No. 3,589,747 and described above, the construction differs from that shown in FIG. 1 in that there is no need to insert a member such as a bolt 9 (see FIG. 1) through the inside of the through hole 8 formed in the hub 4. Also, since the seal member 57 is formed on the axially inner end of the through hole 8, it is possible to prevent the lubrication grease in the space 15 where the tapered rollers 56 are located, from getting into the through hole 8, and thus it is not necessary to increase amount of grease used.

In recent years, from the aspect of improvement in performance of automobile fuel efficiency, comfort, and dynamic power, there has been an increasing demand for lighter rolling-bearing units for road wheel. As a means for making it possible to lighten the rolling-bearing unit, removing any unnecessary material in structure from the hub of the rolling-bearing unit, which supports the non-driven wheels, has been effective. Accordingly, forming a through hole in the hub not only for the rolling-bearing unit which supports the driven wheels, but also for the rolling-bearing unit which supports the non-driven wheels is desired in order to lighten the weight of the automobile.

On the other hand, as shown in FIG. 1, construction for actually removing material from the hub 4 by forming a through hole 8 in the hub 4 has been formerly considered, however, this was performed simply from the aspect of making the bearing common for all wheels. Also, in the construction of bearing shown in the same figure, part of a bolt 9 is inserted through the through hole 8, so that it is not really possible to effectively lighten the weight of the bearing.

Conversely, in the case of the construction disclosed in U.S. Pat. No. 3,589,747 as shown in FIG. 2, no members, such as a bolt, that would increase the weight of the bearing are inserted through the through hole 8 in the hub 4. Therefore, the construction shown in FIG. 2 differs from that shown in FIG. 1 in that it can be effectively lightened, however, in the case of the construction shown in FIG. 2, there is no covering member on the axially outer end of the through hole 8, so that there is a possibility that mud or the like could get into the through hole 8 from the outside. If mud or the like gets inside the through hole 8, there is a possibility that the inner peripheral surface of the through hole 8 could rust, which would lower the durability of the hub 4.

On the other hand, construction that is different from the construction shown in FIG. 2 is also disclosed in U.S. Pat. No. 3,589,747, in which a through hole is formed that penetrates through the center of the hub in the axial direction and where its outer end is covered by a seal member (see FIG. 6 of the patent), but its inner end is not covered. With this construction, the problems that occurred in the construction shown in FIG. 2 do not occur. However, in the case of this construction, there is no seal member for covering the inner end of the through hole. Therefore, in the case of this construction, there is a possibility that the grease in the space where the rolling members are located could get inside the through hole, and in order to make sure there is always enough grease in this space, it is necessary to increase the amount of grease that is filled into the space. Increasing the amount of grease in this way increases the cost and weight of the rolling-bearing unit for road wheel, which is not desired.

SUMMARY OF THE INVENTION

The rolling-bearing unit for road wheel of this invention takes into consideration the problems, and makes it possible to effectively reduce the weight of the rolling-bearing unit that supports the non-driven wheels, as well as makes it possible to reduce the cost and to construct a structure that has excellent durability.

DETAILED DESCRIPTION OF THE PREFERRED EMBODIMENTS

Figure 1:
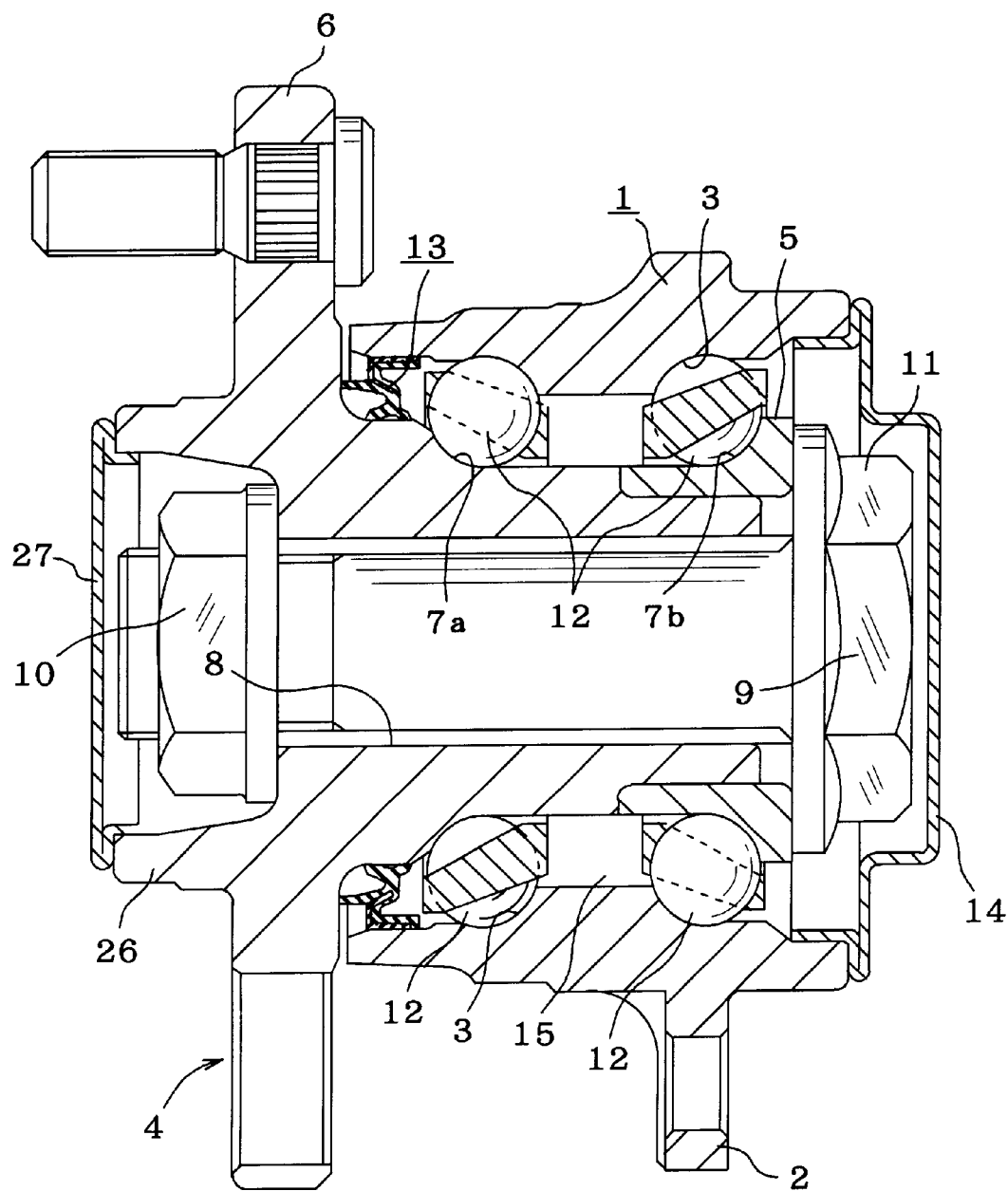
FIG. 1 is a cross sectional view of an example of the conventional rolling bearing unit for a road wheel.

According to one feature of the present invention, a rolling bearing unit for a road wheel comprising a stationary outer ring with first and second ends having an outer peripheral surface formed with a first installation flange on the side of the first end thereof and an inner peripheral surface formed with an outer ring raceway, a rotatable hub with first and second ends having an outer peripheral surface formed with a second installation flange at the second end thereof for supporting the road wheel and an inner ring raceway at an axial middle portion thereof, a plurality of rolling members rotatably provided between the outer ring raceway and the inner ring raceway, a first seal member for providing a shield for the opening at the first end of the outer ring, and a second seal member in a ring shape for providing a shield between the opening portion at the second end of the outer ring and the outer peripheral surface of the axial middle portion of the hub, the hub having a hole section formed to have an opening in the central portion at either end of the hub, a third seal member provided within a space isolated by the first seal member from outside to provide a shield between the opening of the hole section in the first end of the hub and the portion where the rolling members are located between the outer peripheral surface of the hub and the inner peripheral surface of the outer ring, and a fourth seal member for covering the opening of the hole section at the second end of the hub.

The third seal member desirably forms a labyrinth seal to isolate the opening of the hole section at the first end of the hub from the portion where the rolling members are located between the outer peripheral surface of the hub and the inner peripheral surface of the outer ring. The first and third members are desirably made from the same member.

The inner ring raceway may be formed directly on the hub, or the hub may have an inner ring fitted thereon, so that and the inner ring raceway is formed on the inner ring.

In the case of the rolling-bearing unit for a road wheel of this invention and constructed as described above, the hole section is formed in the center of the hub such that there is an opening at the center on both ends, that is the first and second ends, of the hub. Therefore, material that is not necessary for the construction of the hub is removed to effectively reduce the weight.

Furthermore, in the case of this invention, with the use of the third seal member, it is possible to prevent the lubrication grease in the space where the rolling members are located, from getting inside the hub through the opening on the first end of the hole section, and thus there is no need to increase the amount of grease. Accordingly, the problems of increased amount of grease, increased weight and increased cost by forming the hole section are avoided.

Moreover, in the case of this invention, with the use of a fourth seal member, it is possible to prevent mud and the like from the outside from getting inside the hub through the opening on the second end of the hole section, and thus there is no possibility that the inner side of the hub could rust, and accordingly it is possible to sufficiently maintain the durability of the hub.

Now, the present invention is detailed with reference to the attached drawings.

Figure 3:
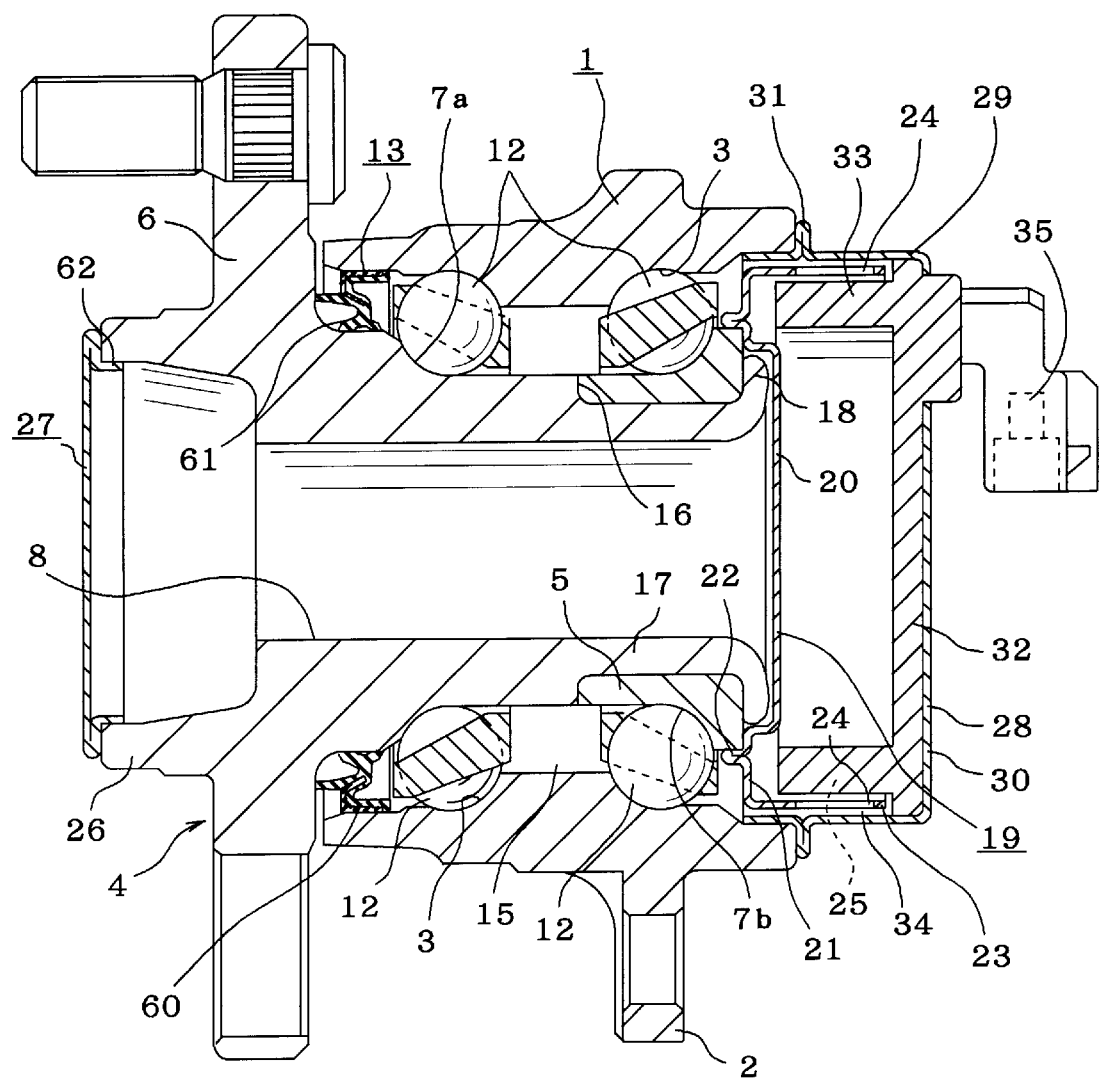
FIG. 3 is a cross sectional view of a first example of the embodiments of the rolling bearing unit for a road wheel according to the present invention.

FIG. 3 shows a first embodiment of the rolling bearing unit for a road wheel according to the invention. This invention is characterized by removing unnecessary material from the hub 4 while tailoring to provide seals in order to make it possible to effectively reduce the weight of the rolling-bearing unit for a road wheel that supports the non-driven wheels, as well as make it possible to construct the rolling-bearing unit at low cost and to maintain excellent durability.

Figure 2:
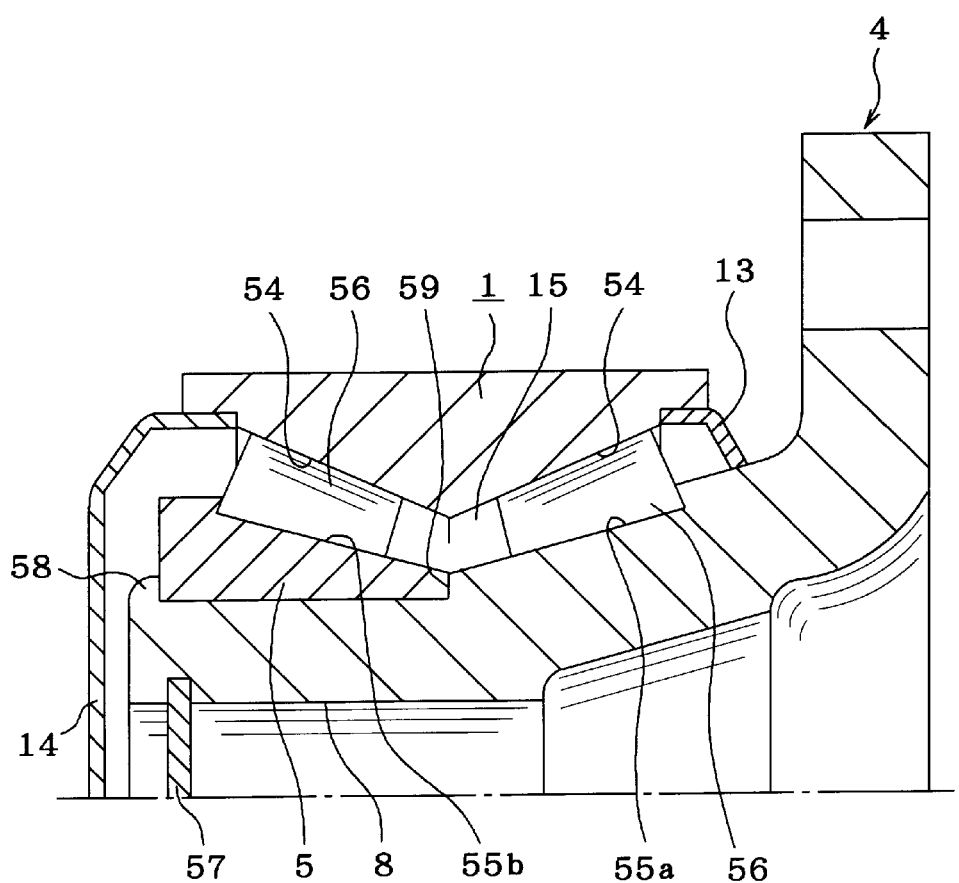
FIG. 2 is a cross sectional view of another example of the conventional rolling bearing unit for a road wheel.

The construction of this invention of the section that rotatably supports the road wheel fastened to the hub 4 with respect to the suspension, is similar to the prior construction shown in FIGS. 1 and 2, therefore the same code numbers will be used for similar parts, and the following explanation will center on the characteristics of this invention with any redundant explanations of similar parts being omitted or abbreviated.

In this embodiment, a rotational speed sensor for detecting the rotational speed of the road wheel has been assembled in the rolling-bearing unit for road wheel.

In the rolling-bearing unit for a road wheel of this invention, the hub 4, which fastens to the non-driven road wheel, is located on the inside of the outer ring 1, which fastens to part of the suspension during use, by way of multiple rolling members 12. The outer ring 1 has a first installation flange 2, and the hub 4 has a second installation flange 6 that is formed around the outer peripheral surface on 1 the axially outer end of the hub 4.

Also, a short, cylindrical-shaped cover 28 with a bottom, that is also referred to as a first seal member in this specification, is attached to the opening on the axially inner end (right end in FIG. 3) of the outer ring 1, and an annular seal ring 13, that is also referred to as a second seal member in this specification, is located between the opening on the axially outer end (left end in FIG. 3) of the outer ring 1 and the outer peripheral surface in the middle portion of the hub 4. This seal ring 13 comprises a metal core 60 which is made of sheet metal such as steel with a substantially channel shaped cross section and entirely formed in an annular shape, and an elastomer elastic member 61 such as rubber.

Moreover, the metal core 60 has a cylindrical section that is formed around the outer edge of the metal core 60 and fitted tightly inside the inner peripheral surface on the axially outer end of the outer ring 1.

Also, the elastic member 61 has seal lips on the edge thereof, which have tip ends to come in contact with the inner peripheral surface of the base end of the second installation flange 6 and with the outer peripheral surface in the middle portion of the hub 4.

This seal ring 13 seals off from the outside the axially inner surface of the base end, and prevents mud or the like from adhering to the axially inner surface of the base end. Accordingly, in the case of this invention, it is possible to prevent a drop in strength of this section due to rusting of the axially inner surface of this base section, and sufficiently maintain the durability of the second installation flange 6. It should be noted that the axially inner surface of the base end of the second installation flange 6 is the weakest portion of the second installation flange 6.

On the other hand, a through hole 8, which is also referred to as the hole section in this specification is formed such that it runs through the center of the hub 4 in the axial direction. Both ends that is first and second ends of this through hole 8 open up the center on both ends of the hub 4.

Incidentally, in order to reduce the weight of the rolling-bearing unit for road wheel, it is desirable that the inner diameter of this through hole 8 be made as large as possible and still be able to withstand the loads that are applied to the rolling-bearing unit.

Moreover, by forming a step section 16 near the axially inner end (right end of FIG. 3) of the hub 4, a small-diameter cylindrical section 17 is formed on the axially inner end from the step section 16. The inner ring 5 is fitted around the outer peripheral surface of this small-diameter cylindrical section 17, and a crimped section 18 is formed over the axially inner end face of the inner ring 5, such that the portion of the axially inner end of this small-diameter cylindrical section 17 that sticks out in the axial direction beyond the inner ring 5 is crimped. The inner ring 5 is held and connected between this crimped section 18 and the step section 16, such that it becomes one piece with the hub 4.

Incidentally, in the example shown in the figure, balls are used as the rolling members 12, however, it is also possible to use tapered rollers in the case of a rolling-bearing unit for heavy automobiles.

Furthermore, a tone wheel 19 is fitted around the outer peripheral surface of the shoulder portion of the inner ring 5. The tone wheel 19 is also referred to as a third seal member in this specification. This tone wheel 19 is made of magnetic sheet metal such as carbon steel sheet metal. By pressing this magnetic sheet metal, a short, cylindrical-shaped cover section 20 with a bottom, a circular ring section 21 that is bent outward in the radial direction from the end edge on the opening of the cover section 20, a cylindrical fitting section 22 that is formed by bending part of the circular ring section 21 in the axial direction opposite from the cylindrical shaped cover section 20, and then bending it back 180 degrees, and a cylindrical section 23 that is formed by bending the outer-diameter portion of the circular ring section 21 in the same direction of the cylindrical-shaped cover section 20 and such that it sticks further in the axially inner direction than the cylindrical-shaped cover section 20.

Slit-shaped through holes 24 that are long in the axial direction are formed at equal intervals around in the circumferential direction of the cylindrical section 23. These through holes 24 and the column sections that exist between each pair of adjacent through holes 24, make tip the detected section that faces the detecting section of the sensor 25 to be described later.

The tone wheel 19, constructed as described above, is fastened to the inner ring 5 by tightly fitting the cylindrical fitting section 22 around the outer peripheral surface of the shoulder portion of the inner ring 5, so that the inner-diameter section of the circular ring section 21 comes at its side face in contact with the mating end face of the inner ring 5.

Accordingly, within the space that is partitioned off from the outside by the cover 28, the cylindrical-shaped cover section 20 of the tone wheel 19, that is a third seal member, seals off between the opening on the axially inner end of the through hole 8 and the space 15 between the outer peripheral surface of the hub 4 and the inner peripheral surface of the outer ring 1 where the rolling members 12 are located.

On the other hand, the opening on the axially inner end of the outer ring 1 is sealed by fitting a cover 28 inside the opening on the axially inner end of the outer ring 1. This cover 28 is made of by pressing sheet metal such as carbon steel or stainless steel and comprised of a cylinder section 29 and bottom section 30. Part of the cylinder section 29 is bent outward in the radial direction all the way around the circumference and then this bent section is bent back on itself 180 degrees to form a protruding section 31. This protruding section 31 is used to position the cover 28 with respect to the outer ring 1, while the tip end (left end in FIG. 3) of the cylinder section 29 fits tightly inside the opening on the axially inner end of the outer ring 1. In this state, the tone wheel 19 is covered by the cover 28. Also, this cover 28 covers the opening on the axially inner end of the outer ring 1, and together with seal ring 13 which seals the space between the opening portion oil the axially outer end of the outer ring 1 and the outer peripheral surface in the middle of the hub 4, the cover 28 prevents foreign matter such as mud or dirt from getting into the space 15 where the rolling members 12 are located, and prevents the lubrication grease in this space 15 from leaking to the outside.

Moreover, a bottomed cylindrical-shaped synthetic resin 32 is provided to contain a passive-type sensor 25 embedded therein, and the base section (right section of FIG. 3) of the cylindrical-shaped synthetic resin 32 is held in the cover 28. A annular-shaped space 34 is formed between the outer peripheral surface of a cylindrical section 33 formed on the front half of this synthetic resin 32 (left half in FIG. 3) and the cylinder section 29 of the cover 28. With the tone wheel 19 attached to the inner ring 5, the cylindrical section 23 of the tone wheel 19 is located within the annular-shaped space 34.

The sensor 25 that is embedded in the synthetic resin 32 is formed such that it is generally annular and it comprises a permanent magnet, stator and coil. Also, The detecting portion of this sensor 25 faces the inner peripheral surface of the cylindrical section 23 of the tone wheel 19 with a small gap therebetween.

Incidentally, the construction of this kind of annular sensor 25 itself has been known prior to this invention, and since it is not a relevant element of this invention, so a detailed explanation of this sensor 25 will be omitted.

Moreover, a cylindrical section 26 on the axially outer end of the hub 4 protrudes in the axial direction such that the area around the opening on the axially outer end of the through hole 8 is covered. A cap 27 made of sheet metal, that is also referred to as a fourth seal member in this specification, fits tightly inside the opening end of this cylindrical section 26, and it tightly covers the opening on the axially outer end of the through hole 8. This cap 27 is made by pressing thin sheet metal having a thickness of about 1 mm in a bending process.

If the outer peripheral surface of the cylindrical section 62 of this cap 27 becomes rusty, there is a possibility that the rusting will cause a small gap to appear between the outer peripheral surface of the cylindrical section 62 and the inner peripheral surface on the end of the cylindrical section 26. If this kind of gap appears, there is a possibility that mud or the like will get inside the through hole 8 and that the surface of the through hole 8 will rust causing a decrease in strength of the hub 4. In this embodiment, in order to prevent mud or the like from getting inside the through hole 8, the surface of the cap 27 is made to be rust proof by coating it with a cationic coating, zinc plating, or the like to make it more difficult for the outer peripheral surface of the cylindrical section 62 to rust.

In the case of the rolling-bearing unit for a road wheel of this invention constructed as described above, a through hole 8 is formed in the center of the hub 4 such that it penetrates through the hub 4 in the axial direction, and no member is inserted through this through hole 8. Accordingly, portions of the hub 4 where no material is necessary for its construction have been removed, making it possible to effectively reduce its weight.

Furthermore, in the case of this invention, in the space that is partitioned off by the cover 28, there is a shield of the tone wheel 19, which is a third seal member, between the opening on the axially inner end of the through hole 8 and the space 15 between the outer peripheral surface of the hub 4 and the inner peripheral surface of the outer ring 1 where the rolling members 12 are located. Also, this tone wheel 19 prevents the lubrication grease in the space 15 where the rolling members 12 are located, from getting inside the through hole 8 through its axially inner end, and thus there is no need to increase the amount of grease. Accordingly, in the case of this invention, problems such as increased weight due to an increase in the required amount of grease, or increased costs, that accompany forming the through hole 8, do not occur.

Furthermore, in the case of this invention, a cap 27 made of sheet metal, which is a fourth seal member, fits tightly inside the opening end of the cylindrical section 26 that is formed on the surface of the axially outer end of the hub 4, so that it covers the opening on the axially outer end of the through hole 8. Moreover, in the case of this invention, the cap 27 prevents mud and the like from getting in from the outside into the opening on the axially outer end of the through hole 8, and thus prevents the inside of the hub 4 from rusting, making it possible to sufficiently maintain the durability of the hub 4. Also, the cap 27 is able to prevent rocks and the like from getting into the through hole 8 and thus is able to prevent these rocks or like from being thrown while the automobile is running.

Furthermore, a rotational speed sensor has been assembled in the rolling-bearing unit for a road wheel of this embodiment. While the rolling-bearing unit is in operation and as the road wheel (not shown in the figure) that is attached to the hub 4 turns, the slit-shaped through holes 24 formed in the cylindrical section 23 and the columns that exist between pairs of through holes 24 that are adjacent in circumferential direction alternately pass by the detecting portion of the sensor 25. As a result, the density of the magnetic flux that flows through the sensor 25 changes, and thus the output of the sensor 25 changes. The frequency that the output of sensor 25 changes is proportional to the rpm of the road wheel. Also, by sending the output from the sensor 25 to a controlling device by way of a connector 35 and harness (not shown in the figure) connected to the convector 35, it is possible to adequately control an anti-lock-brake system (ABS) or traction control system (TCS). Particularly, in the case of this embodiment, the tone wheel 19 of the rotational speed sensor, which is a third seal member, fulfills the role of tightly covering the axially inner end of the through hole 8. Since there is no need to form the tone wheel 19 separately from a seal member for tightly covering the axially inner end of the through hole 8, it is possible to reduces the number of parts and amount of work needed for constructing a rolling-bearing unit for a road wheel which a rotational speed sensor is assembled, as well as reduce its cost.

Figure 4:
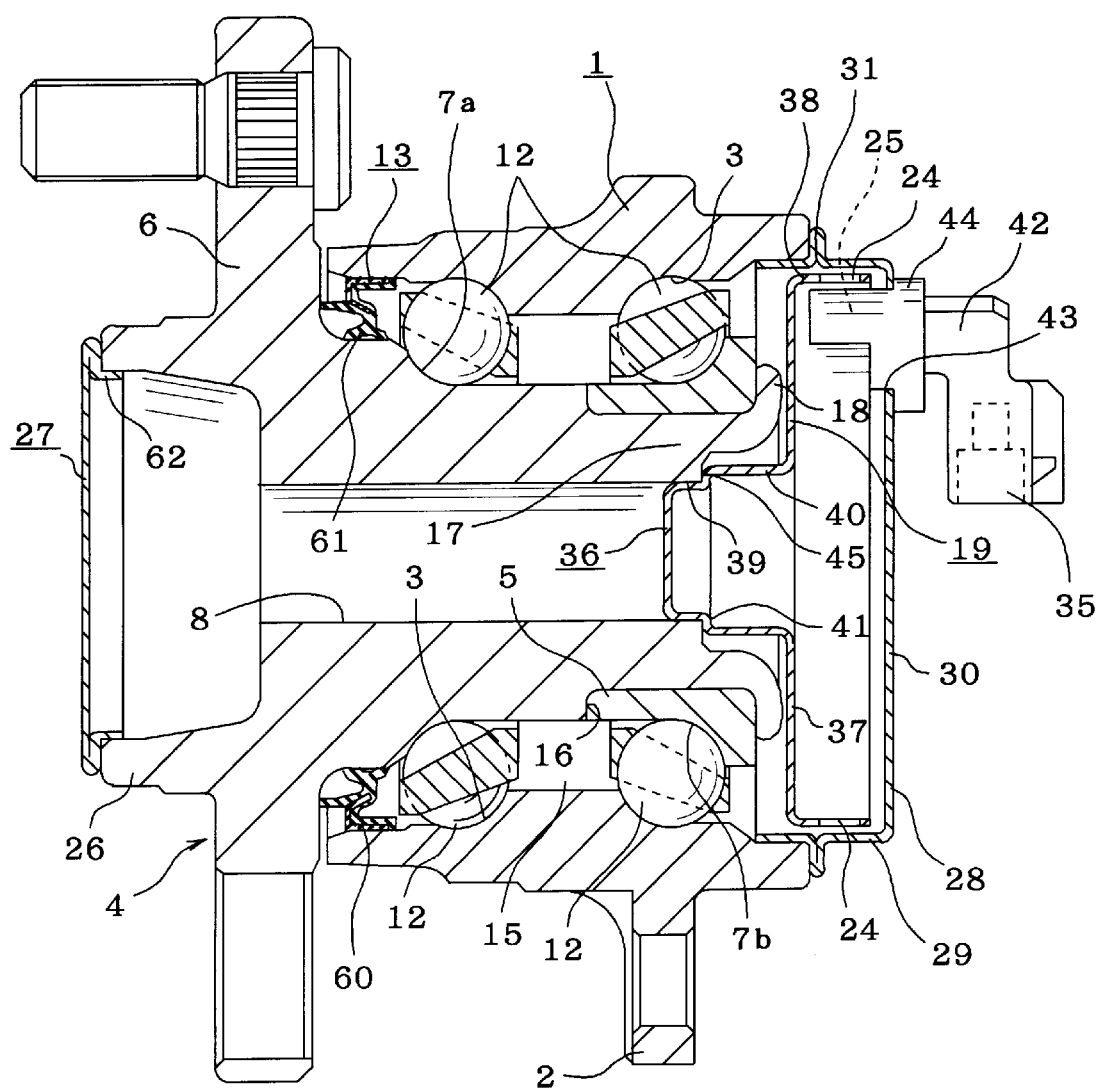
FIG. 4 is a cross sectional view of a second example of the embodiments of the rolling bearing unit for a road wheel according to the present invention.

Next, FIG. 4 shows a second embodiment of the invention. This embodiment differs from the first embodiment in that the tone wheel 19, which is a third seal member, is directly fastened to the axially inner end of the hub 4 and not by way of the inner ring 5. This tone wheel 19 is made by processing magnetic sheet metal such as low carbon steel sheet using a drawing process or the like, and it comprises a cylindrical stepped cover section 36 with a bottom, a circular ring section 37 that is continuous with the stepped cover section 36 and is bent outward in the radial direction from the edge of the opening of the stepped cover section 36, and a cylindrical section 38 that is continuous with the circular ring section 37 and is bent in the axial direction from the outer-diameter edge of the circular section 37 in the opposite direction of the stepped cover section 36. Of these, the stepped cover section 36 comprises a small-diameter cylindrical section 39 on the bottom side and a large-diameter cylindrical section 40 on the opening side which are connected by a stepped section 41 with each other. Also, slit-shaped through holes 24 which are long in the axial direction are formed in the cylindrical section 38 at equal intervals around in the circumferential direction, and this cylindrical section 38 functions as the detected section of the tone wheel 19. In addition, by fitting the small-diameter cylindrical section 39 of the stepped cover section 36 tightly inside the axially inner end of the through hole 8, the tone wheel 19 is directly fastened to the axially inner end of the hub 4, and the axially inner end of the through hole 8 is covered by this tone wheel 19.

Moreover, at the same time, the stepped section 41 comes in contact with the stepped section 45 formed around part of the inner peripheral surface of the small-diameter cylindrical section 17 of the hub 4, and it makes it possible to position the tone wheel 19.

On the other hand, a cover 28 made of sheet metal and, which is a first seal member, fits inside the axially inner end of the outer ring 1 and covers the opening on the axially inner end of the outer ring 1. A sensor unit 42, which supports the sensor 25 therein, is fastened to the bottom plate 30 of the cover 28 such that the tip end, which contains the detecting portion of the sensor 25, is located on the inside of the cover 28.

Therefore, in the case of the embodiment shown in the figure, a through hole 43 is formed on part of the bottom plate 30 and the tip end of the sensor unit 42 is inserted through this through hole 43 and the flange section 44 of the sensor unit 42 comes in contact with the inside surface of the bottom plate 30 around the peripheral edge of the through hole 43 such that this flange section 44 is joined to the cover 28.

The sensor 25, which is supported on the inside of this kind of sensor unit 42, is an active-type sensor that comprises an IC containing a magnetism detection element, such as a Hall element or magneto-resistive element, whose output changes in accordance to the amount of magnetic flux, and a waveform shaping circuit for forming an output waveform for that magnetism detection circuit, and a permanent magnet. Also, the detecting portion formed oil one side of the sensor unit 42 faces through a small gap the inner peripheral surface around the cylindrical section 38 of the tone wheel 19.

The sensor 25 used in this embodiment of the rolling-bearing unit for road wheel with rotational speed sensor, or the sensor 25 used in the first embodiment described above, is not limited to that explained above, and it is possible to exchange the one used in this embodiment and the one used in the first embodiment, and being not limited to a magnetism detection type, it is possible to used other construction such as a photoelectric type sensor, eddycurrent type sensor, etc. The other construction and function are substantially the same as that described above for the first embodiment, and the same symbols are used for identical parts and redundant explanations are omitted.

Figure 5:
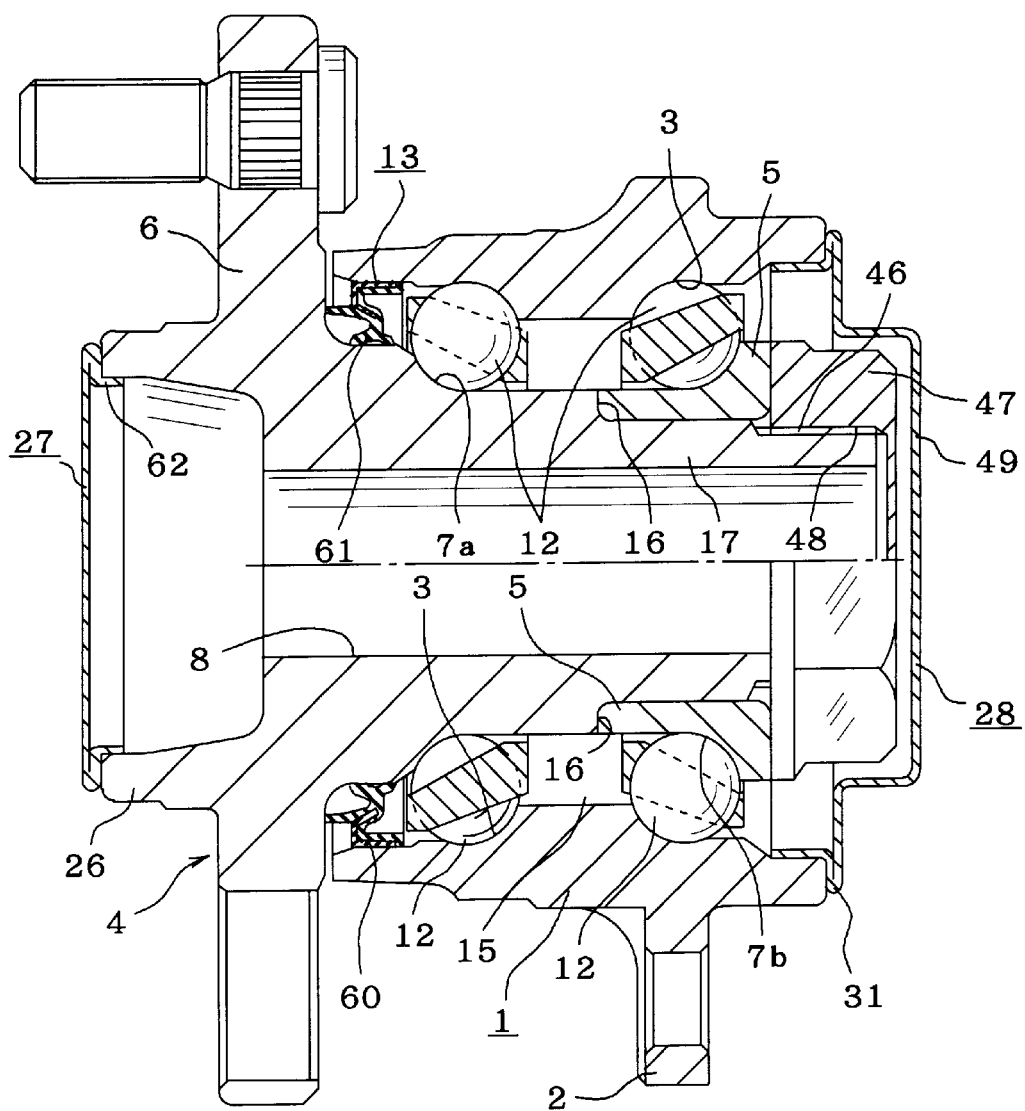
FIG. 5 is a cross sectional view of a third example of the embodiments of the rolling bearing unit for a road wheel according to the present invention.

Next, FIG. 5 shows a third embodiment of the invention. This embodiment differs from the other embodiments described above in that the axially inner end of the hub 4 is not crimped in order to fasten the inner ring 5 to the hub 4. Instead, male threads 46 are formed around the outer peripheral surface on the tip end half of the small-diameter cylindrical section 17 formed on the axially inner end of the hub 4. Also, with the inner ring 5 fitted around the small-diameter cylindrical section 17, a cap nut 47, which is a third seal member, is screwed on tightly to the male threads 46. In this way, the inner ring 5 is held between the step section 16 formed on the hub 4 and the end surface of the cap nut 47, and is fastened to the hub 4.

Therefore, the length in the axial direction of the female thread section 48 formed in the cap nut 47 is long enough such that the end surface of the cap nut 47 comes in contact with the axially inner end face of the inner ring 5 when the cap nut 47 is screwed tightly on to the male threads 46.

On the other hand, a bulging section 49 that protrudes in the axial direction is formed in the center of the cover 28 which is a first seal member, and it prevents interference between the cap nut 47 and the cover 28.

This embodiment differs from the other embodiments in that no rotational speed sensor is assembled in the rolling-bearing unit for road wheel. The other construction and function is substantially the same as that described above for the second embodiment, and the same symbols are used for identical parts and redundant explanations are omitted.

Figure 6:
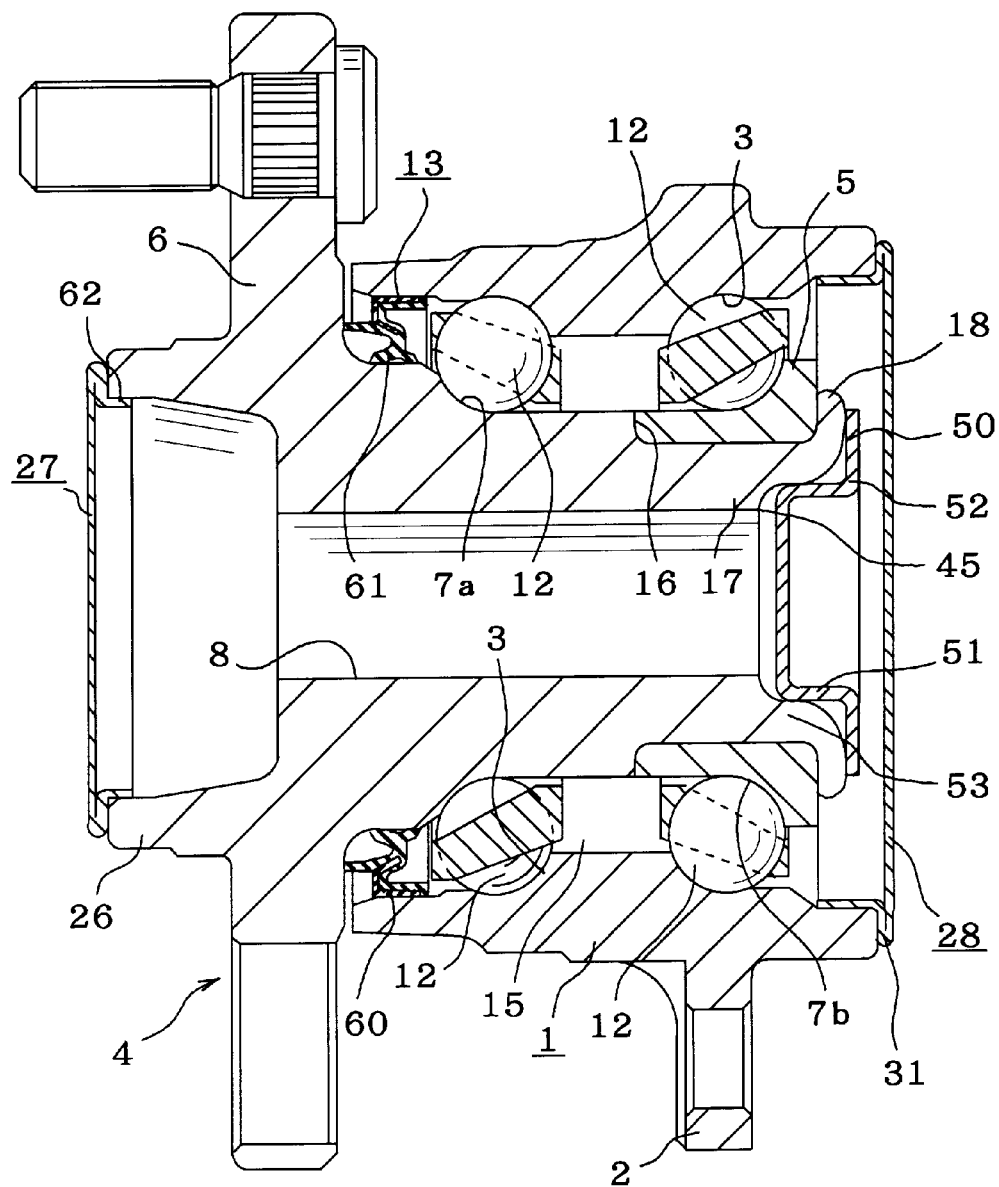
FIG. 6 is a cross sectional view of a fourth example of the embodiments of the rolling bearing unit for a road wheel according to the present invention.

Next, FIG. 6 shows a fourth embodiment of the invention. In this embodiment, a cover 50, which is a third seal member, is made of an oil-proof synthetic resin material and fastened to the axially inner end of the hub 4, which is nearly the same as that of first and second embodiments shown in FIGS. 3 and 4. This cover 50 comprises a short, cylindrical section 51 with a bottom, and a rim section 52 that is bent outward in the radial direction from the edge on the opening of the cylindrical section 51 of the cover 50 and is continuous all the way around with the cylindrical section 51 The cylindrical section 51 is inserted into and secured firmly with interference fitting in place inside the thin cylindrical section 53 formed on the axially inner end of the hub 4 such that the side surface of the rim section 52 comes in contact with the axially inner surface of the crimped section 18. In this way, the axially inner end of the through hole 8 is tightly covered by the cover 50.

In the case of the embodiment constructed as described above, since the cover 50, which is a third seal member, is made of synthetic resin, the rolling-bearing unit for a road wheel can be made more cheaply and more lightweight than a rolling-bearing unit which uses a cover made of metal, and this cover 50 is capable of larger elastic deformation than a cover made of metal.

Accordingly, even when due to the crimping of part of the thin, cylindrical section 53, the inner-diameter dimensions of the other parts of the thin, cylindrical section 53 become a little smaller than the proper value resulting in that the interference fit of these parts with the synthetic resin cover 50 is tight, the cover 50 can be sufficiently fastened with fitting without any part of the cover 50 damaged such as cracking.

Moreover, in this embodiment, it is possible to reduce the length in the axial direction of the cover 28, which acts as a first seal member, by the size of the cylindrical sections 23, 38 (see FIGS. 3 and 4) of the tone wheel 19, or the cap nut 47 (see FIG. 5), which are not used in this embodiment.

In the case of using the synthetic, resin cover 50 of this embodiment, it is possible to form anchoring protrusions at several places around the outer peripheral surface of the cylindrical section 51 of the cover 50, as well as matching grooves or indentations, engaged with the anchoring protrusions respectively, around the inner peripheral surface of the thin, cylindrical section 53 that is formed on the axially inner end of the hub 4.

By doing so, when the cover 50 is fitted and fixed inside the thin, cylindrical section 53, the anchoring protrusions are fitted inside the grooves or indentations, making it possible to prevent the cover 50 from accidentally coming out from the axially inner end of the hub 4.

The other construction and function is substantially the same as that described above for the second embodiment, and the same symbols are used for identical parts and redundant explanations are omitted.

Figure 7:
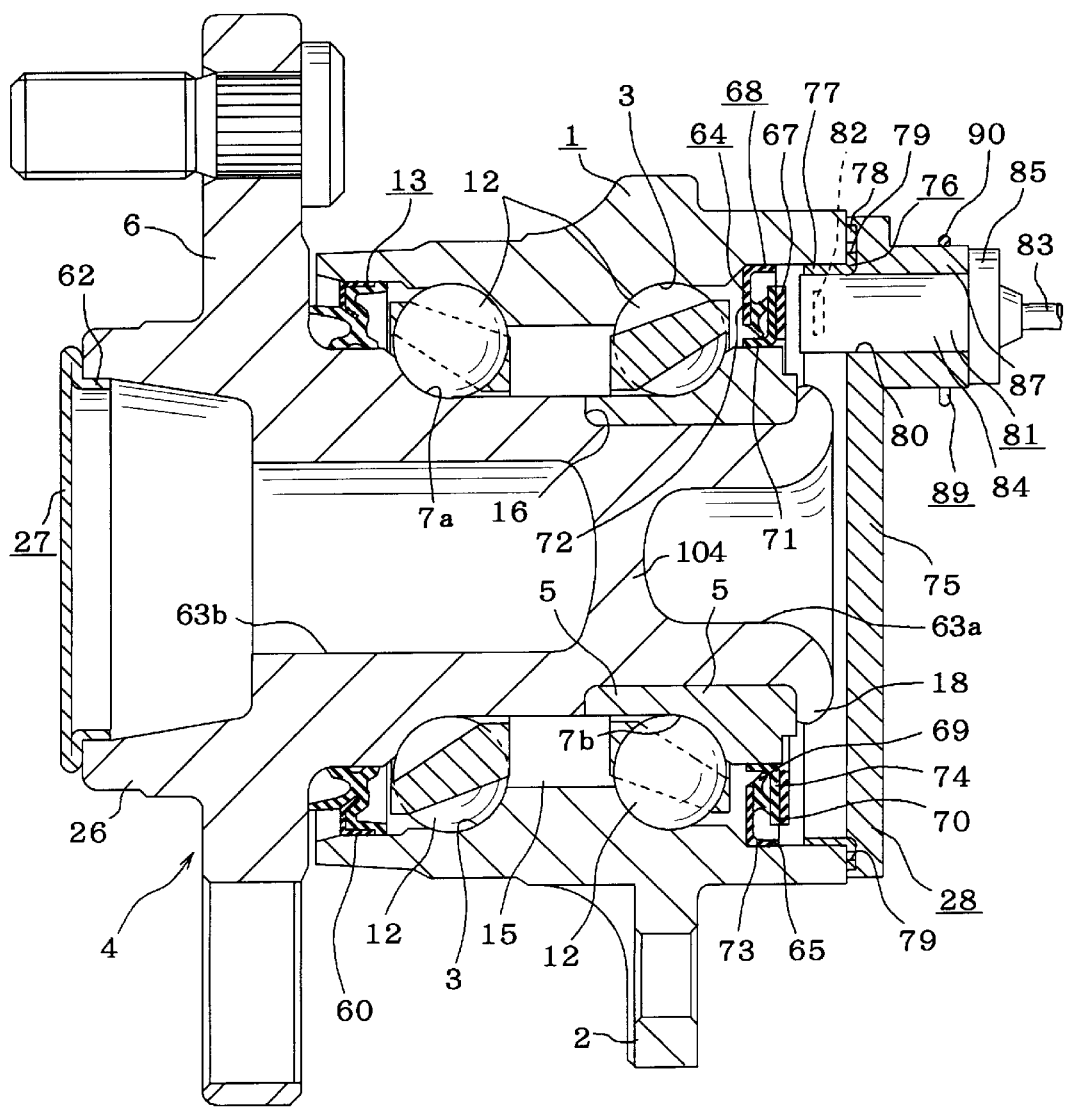
FIG. 7 is a cross sectional view of a fifth example of the embodiments of the rolling bearing unit for a road wheel according to the present invention.

Next, FIG. 7 shows a fifth embodiment of the invention. This embodiment differs from the embodiments described above in that the through hole 8 (see FIGS. 3 to 6) in the axial direction is not foxed through the center of the hub 4. Instead, in this embodiment, concave holes 63a, 63b, which is a hole section, are formed on both ends of the hub 4 such that they open in the center on the ends of the hub 4, respectively.

As in the case of the through hole 8 formed as described in the embodiments above, in order to lighten the weight of the rolling-bearing unit for road wheel, it is desirable that the inner diameter of these concave holes 63a, 63b be made as large as possible and still be capable of withstanding the loads applied to the rolling-bearing unit for road wheel.

Also, in order to lighten the weight of the rolling-bearing unit, it is desirable that the thickness of the partitioning section 104 that exists between the pair of concave holes 63a, 63b in part of the hub 4 be made as thin as possible and still be capable of withstanding the loads applied to the rolling-bearing unit.

Moreover, in this embodiment, concave holes 63a, 63b do not need to be formed on both ends of the hub 4, but it is possible to form a long concave hole in the axial direction on one of the ends of the hub 4, and then it is possible to reduce the weight of the rolling-bearing unit by making the partitioning section between the bottom of the concave hole and the end of the hub 4 with a desired thickness. However, when forming a long concave hole in this way in the hub 4 in the axial direction, it is difficult to form this concave hole using a relatively inexpensive forging process. Therefore, in this embodiment, concave holes 63a, 63b are formed on both ends of the hub 4 so that they can be formed using a relatively inexpensive forging process.

On the other hand, a cover 28 made of synthetic resin and which is a first seal member covers the opening on the axially inner end of this outer ring 1. This cover 28 comprises a main section 75 that is formed in a circular disk shape using injection molded synthetic resin, and a metal sleeve 76 whose base is embedded in and supported in an outer edge portion on the axially outer side of the main section 75. This sleeve 76 is made of sheet metal, such rust-proof stainless steel sheet, or low carbon steel sheet whose surface is treated with chrome plating or the like to make it rust-proof, and is formed such that it is formed in an annular shape with an L-shaped cross section, and it comprises a cylindrical fitting section 77 and an outward facing rim section 78 that is bent outward in the radial direction from the base end edge of the cylindrical section 77. This sleeve 76 is connected to the outer edge on the axially outer side of the main section 75 by molding the outward rim section 78 during injection molding of the main section 75. Also, the outward rim section 78 of this sleeve 76 is embedded in the outer edge portion of the main section 75, and the tip half of the cylindrical section 77 is protruded in the axially outer direction further than the main section 75.

Several through holes 79 are formed intermittently in the circumferential direction around the outward rim section 78, and the synthetic resin from which the main section 75 is made fills into these through holes 79 when forming the main section 75 by injection molding, and thus increases the bonding strength between the main section 75 and the sleeve 76.

Constructed as described above, the axially outer surface on the outer edge of the main section 75 comes in contact with the axially inner surface of the outer ring 1, and the tip half of the cylindrical fitting section 77 of the sleeve 76 is fitted inside the inner peripheral surface on the axially inner end of the outer ring 1, and in this way the opening on the axially inner end of the outer ring 1 is covered with the cover 28. Also, the space 15 where the rolling members 12 are located, is partitioned off on the axially inner end thereof by the cover 28.

In this embodiment, a combination seal ring 64, which is a third seal member, is located between the outer peripheral surface on the axially inner end (right end in FIG. 7) of the hub 4 and the inner peripheral surface on the axially inner end of the outer ring 1, and it shields between the space 15 between the outer peripheral surface of the hub 4 and the inner peripheral surface of the outer ring 1 where the rolling members 12 are located, and the opening on the axially inner end of the concave hole 63a formed on the axially inner end of the hub 4.

This combination seal ring 64 comprises a seal ring 65 and slinger 74. Of these, the slinger 74 is made of sheet metal such as low carbon steel sheet or stainless steel sheet, and is formed in a ring shape with an L-shaped cross section.

Also, a permanent magnet encoder 67 that is made of ribber which is impregnated with strong magnetic material such as ferrite, is joined to the slinger 74. This encoder 67 is magnetically oriented in the axial direction, and by alternating it magnetic orientation at equal intervals in the circumferential direction, the South and North poles alternate at equal intervals around in the circumferential direction on the axially inner surface of the encoder 67.

Also, this encoder 67 is connected to and held on the axially inner surface of the circular ring section 70 of the slinger 74 by adhesive or seizure.

With this kind of encoder 74, the cylindrical section 71 is fitted around the outer peripheral surface of the shoulder portion of the inner ring 5, and fitted around and fastens to the axially inner end of the inner ring 5.

On the other hand, the seal ring 65 comprises a metal core 68, that is made of sheet metal such as low carbon steel sheet or stainless steel sheet and is formed in an annular shape with an L-shaped cross section, and an elastic member 69 made of an elastomer such as rubber and that is supported by the axially inner surface of the circular ring section 72 of the metal core 68. Also, this elastic member 69 has multiple seal lips (there are two in the embodiment shown in the figure) on its tip. With this kind of seal ring 65, the cylindrical section 73 of the metal core 68 is fitted tightly around the inner peripheral surface on the axially inner end of the outer ring 1, so that the seal ring 65 is fitted into and fastened to the axially inner end of the outer ring 1

The tip end edges of the seal lips of the elastic member 69 of the seal ring 65 come in contact all the way around the outside peripheral surface of the cylindrical section 71 and circumferentially to the axially outer surface of the circular ring section 70 of the slinger 74, so that the space 15 where the rolling members 12 are located, is isolated from the space inside the concave hole 63a.

Moreover, on part of the main section 75 of the cover 28, that faces the axially inner surface of the encoder 67, an insertion hole 80 is formed such that it penetrates the main section 75 and runs in the axial direction of the outer ring 1. The tip end portion of a sensor unit 81 is inserted through this insertion hole 80. This sensor unit 81 comprises an IC 82 which contains a magnetism detection element, such as a Hall element or magneto-resistive clement (MR element), whose output changes in accordance to the amount of magnetic flux, and a waveform shaping circuit for forming an output waveform for the magnetism detection circuit, and a magnetic pole piece for directing the magnetic flux output from the encoder 67 (or flowing into the encoder 67) to the magnetism detection element, and these components are embedded in synthetic resin. The end of a harness 83 for sending the signal that is output from the IC 82 as a shaped waveform to a controlling device (not shown in the figure) is directly connected (not by way of a connector or the like) to the sensor unit 81. By omitting the connector, it is possible to reduce the cost of the rolling-bearing unit with rotational speed sensor by the amount of the connector.

Figure 8:
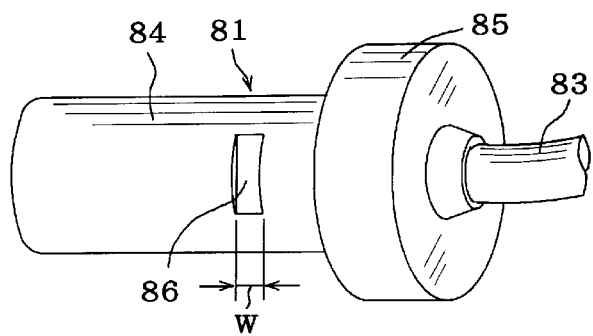
FIG. 8 is a perspective view of a sensor unit used in the fifth example.
Figure 9:
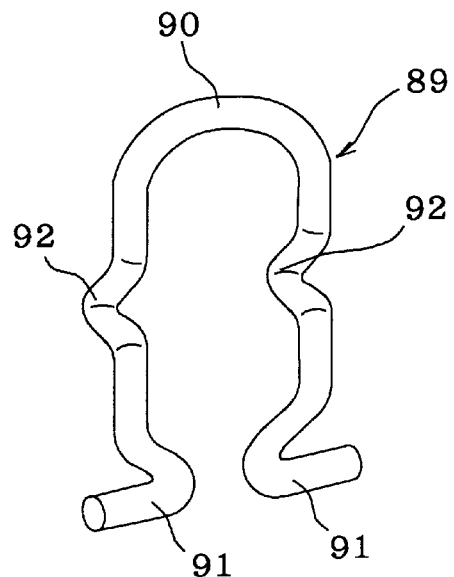
FIG. 9 is a perspective view of a connection spring used in the fifth example.
Figure 10:
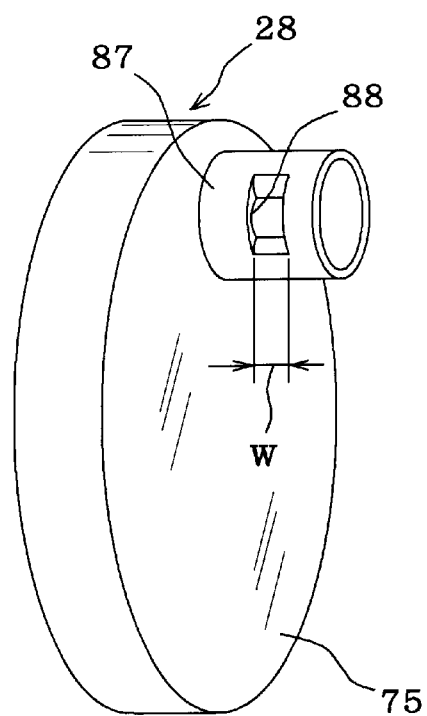
FIG. 10 is a perspective view of a cover used in the fifth example.

This kind of sensor unit 81, as shown in detail in FIG. 8, comprises a column-shaped insert section 84 that is formed on a portion closer to the tip end (left end in FIG. 8) and can be freely and tightly inserted through the insertion hole 80, and an outward flange-shaped rim section 85 that is formed at the base end (right end in FIG. 8) of the insert section 84 and acts as a positioning section.

Also, anchoring grooves 86 that are long in the circumferential direction are formed at two places on opposite sides in the radial direction from each other on the outer peripheral surface in the middle portion of the insert section 84, such that the bottom surfaces of the anchoring grooves are parallel with each other.

On the other hand, on 1 part of the outer peripheral surface of the cover 28 (the side opposite the side of the space 15 where the rolling members 12 are located and which is covered by this cover 28, or the right side in FIG. 7) an anchoring tube 87 is formed around the opening of the insertion hole 80. The inner peripheral surface of this anchoring tube 87 forms a single cylindrical surface together with the inner peripheral surface of the adjacent insertion hole 80.

Also, in the middle portion of the anchoring tube 87, at two places on opposite sides from each other in the axial direction, notches 88 that are long in the circumferential direction are formed such that they communicate the inner and outer peripheral surfaces of the anchoring tube 87 with each other.

The dimensions are regulated such that the notches 88 face the installation grooves 86 on the insert section 84 when the insert section 84 of the sensor unit 81 is inserted through the insertion hole 80 such that the rim section 85 comes in contact with the end surface of the insert cylinder anchoring tube 87. The width 'w' of the installation grooves 86 is made larger than the outer diameter of the wire for the connection spring 89 (described later), and the width 'W' of the notches 88 is even larger than the width 'w' of the installation grooves 86.

The sensor unit 81 is fastened inside the anchoring tube 87 by the connection spring 89. This connection spring 89 is made by bending elastic and anti-corrosive wire, such as stainless steel for spring, chrome-plated or zinc-plated spring steel, and comprises a U-shaped curved section 90, and a pair of leg sections 91 that are made by bending both ends of the curved section 90 in opposite directions.

The connection spring 89 in the free state is subjected to an elastic force in a direction that the interval between the pair of leg sections 91 is closed.

Also, two retaining portions 92 are formed in the middle portion of the curved section 90, at two places that face each other. These retaining portions 92 are formed by bending the middle portion of the curved section 90 into '<' shapes that face the same direction (axial direction of the anchoring tube 87 when installed).

The work of connecting the sensor unit 81 to the anchoring tube 87 with the connection spring 89 as performed as follows.

First, the insert section 84 of the sensor unit 81 is inserted through the anchoring tube 87 and the insertion hole 80 until the rim section 85 comes in contact with the tip end surface of the anchoring tube 87.

In this state, the dimensions of each part are regulated such that there is a small gap with a desired thickness (for example 0.5 mm) between the detecting section on the tip end of the insert section 84 of the sensor unit 81 and the inside surface of the encoder 67.

Also, in this state, the insert section 84 is turned with respect to the insertion hole 80 so that the installation grooves 86 oil the insert section 84 and the notches 88 on the anchoring tube 87 come together.

Next, the space between the leg sections 91 of the connection spring 89 are spread open against the elastic force while the outer peripheral surface of part of the anchoring tube 87 where the notches 88 are formed is retained.

The space between the tip ends of the pair of legs 91 in the free state is narrower than the space between the pair of notches 88, so the connection spring 89 does not accidentally come apart from the cover 28.

Moreover, in this state, the retaining portions 92 formed on the connection spring 89 are engaged through the notches 88 with the axially outer surface (left side surface in FIG. 8) of the installation grooves 86 formed on the insert section 84 of the sensor unit 81. In this engagement, the retaining portions 92 are elastically pressed in the axial direction of the anchoring tube 87.

Also, these retaining portions 92 apply an elastic force on the sensor unit 81 in a direction that pushes the rim section 85 in the direction toward the end surface of the anchoring tube 87, and tightly fastens the sensor unit 81 in the cover 28.

In this embodiment as well, a cap 27 is fastened inside the cylindrical section 26 formed on the axially outer end surface of the hub 4 to cover the opening oil the axially outer end of the concave hole 63b. Also, in this embodiment, the cap 27 prevents rust from occurring on the inner peripheral surface of the other concave hole 63b.

In the case of this embodiment, constructed as described above, the grease in the space 15 where the rolling members 12 are located is prevented from getting into the opening on the axially inner end of the concave hole 63a formed in the axially inner end of the hub 4 by a the combination seal ring 64 that is a third seal member.

This combination seal ring 64 is located between the outer peripheral surface on the axially inner end of the hub 4 and the inner peripheral surface oil the axially inner end of the outer ring 1, and in this embodiment, it reduces the size of the space 15 where the rolling members 12 are located in comparison with the other embodiments. As a result, in this embodiment, it is possible to reduce even further the amount of grease to be filled in the space 15, and thus makes it possible to reduce further the weight and cost of the rolling-bearing unit for road wheel.

Incidentally, the present example provides a structure in which the sensor unit 81 per se can be replaced, so that the whole rolling bearing unit need not be replaced, when any trouble is caused in the market. Even if dust enters the interior through the hole 80 of the cover 28 during operation for removing the sensor unit 81 from the cover 28 to replace the sensor unit 81, the combination seal ring 64 would be a bar to prevent the dust from entering the space 15 where the rolling members 12 are located. Thus, it prevents any trouble in operation which may cause the bearing to become inadequate for use in an early stage of use.

Furthermore, in this embodiment, the cover 28 is constructed such that it is fixedly fitted into the inner peripheral surface on the axially inner end of the outer ring 1, however, this cover 28 could also be constructed such that it is fitted onto the outer peripheral surface on the axially inner end of the outer ring 1. By adopting this kind of construction, since inserting the fitting section of the cover 28 into the axially inner end of the outer ring 1 is not necessary, there is no need to consider the interference between part of the cover 28 and the third seal member, and it is possible to shorten the length of the rolling-bearing unit for road wheel by that amount.

The other construction and function are substantially the same as that described above for the first embodiment, and the same symbols are used for identical parts and redundant explanations are omitted.

Figure 11:
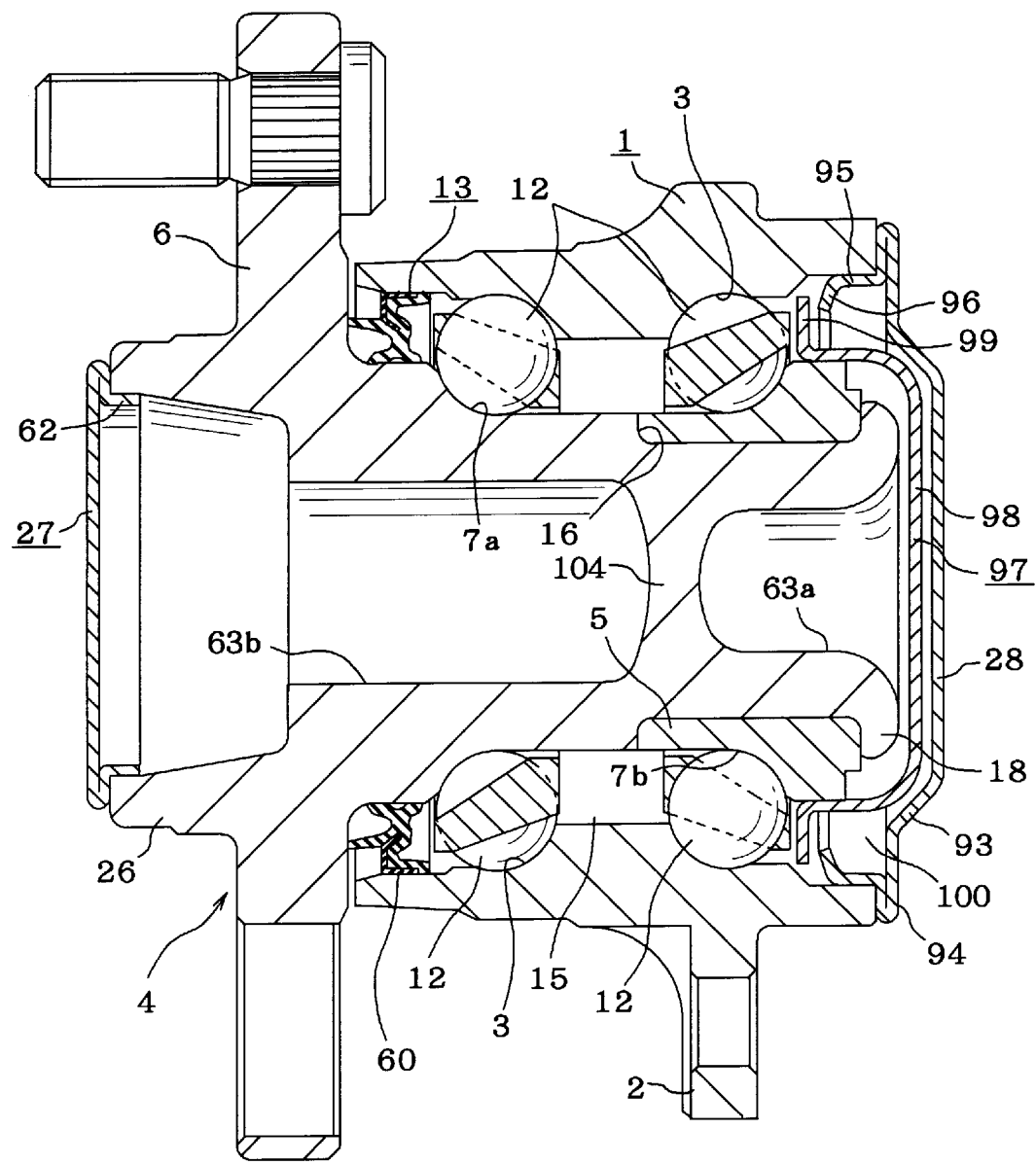
FIG. 11 is a cross sectional view of a sixth example of the embodiments of the rolling bearing unit for a road wheel according to the present invention.

Next, FIG. 11 shows a sixth embodiment of the invention. In this embodiment, a cover 28, which is a first seal member, is fitted into the axially inner end of the outer ring 1 to cover the opening on 1 the axially inner end of the outer ring 1.

The cover 28 is made by pressing sheet metal such as low carbon steel sheet or stainless-steel sheet, and it comprises a dish-shaped cover section 93, an abutting section 94 that is continued to the radially outer edge around the cover section 93, and formed by bending the outer edge outward in the radial direction, then bending this bent section further until it is bent 180 degrees, a fitting tube section 95 that is continued to the radially inner edge of the axially outer portion of the abutting section 94, and formed by bending the inner edge, at a right angle away from the cover section 93, and an inward rim section 96 that is continued to the tip end edge of the fitting tube section 95 and formed by bending the tip end edge inward in the radial direction.

While positioning the cover 28 with the abutting section 94 with respect to the outer ring 1, the fitting tube section 95 is tightly fitted inside the opening on the axially inner end of the outer ring 1, so that this cover 28 tightly covers the opening on the axially inner end of the outer ring 1.

Moreover, a cover 97, which is a third seal member, is fixedly fitted around the outer peripheral surface of the shoulder portion of the inner ring 5, which is fitted around the outer peripheral surface on the axially inner end of the hub 4. This cover 97 is made of sheet metal and is formed by a process such as drawing or the like, and it comprises a round pot-shaped cylindrical section 98, and an outward rim section 99 that is formed by bending the edge around the opening of the cylindrical section 98 radially outward and circumferentially continued. The edge around the opening of the tube section 98 is fitted fixedly with interference fitting tightly around the outer peripheral surface of the shoulder portion of the inner ring 5.

After the cover 97 has been fitted around the inner ring 5, the cover 28 is then fitted into the inner peripheral surface of the opening on the axially inner end of the outer ring 1. In this state, the outer peripheral edge of the outward rim potion 99 of the cover 97 faces the inner peripheral surface of the axially inner end of the outer ring 1 through a small gap of about 1 mm therebetween. The cover 97 covers the space between the outer peripheral surface on the axially inner end of the inner ring 5 and the inner peripheral surface on the axially inner end of the outer ring 1 with a labyrinth seal.

Moreover, the axially outer surface of an inward rim 96 formed around the cover 28 faces the outer peripheral edge around the axially inner end of the outward rim 99 through a small gap of about 1 mm therebetween. The cylindrical section 98 and the cover section 93 of the cover 28 face each other through a small gap therebetween.

In this embodiment, constructed as described above, the outward rim 99 formed around the cover 97 covers the space between the outer peripheral surface on the axially inner end of the inner ring 5 and the inner peripheral surface oil the axially inner end of the outer ring 1 with a labyrinth seal. Accordingly, in this embodiment, the outward rim 99 prevents grease in the space 15 where the rolling members 12 are located from leaking out, and together with making it possible to keep down the amount of grease needed for filling this space 15, it makes it possible to increase the rotational torque as in the case of using the combination seal ring 64 (see FIG. 7). Furthermore, in this embodiment, the inward rim 96 faces the outward rim 99 through a small gap therebetween, so that a labyrinth seal is formed in this section as well. This makes it possible to even more effectively prevent grease from leaking from the space 15 where the rolling members 12 are located into the space 100 that is surrounded by the cover 97 and cover 28. Also, since the cover 97 and the outside surface of the cover 28 face each other through a small gap therebetween, it is difficult for grease to get into the center of the space 100 surrounded by the cover 97 and cover 28, even if grease leaks into the space 100, and thus it is possible to keep the amount of grease reduction in the space 15 at a minimum.

Incidentally, this embodiment differs from the fifth embodiment described above in that an rotational speed sensor has not been installed in the rolling-bearing unit for road wheel.

The other construction and function are substantially the same as that described above for the fifth embodiment, and the same symbols are used for identical parts and redundant explanations are omitted.

Figure 12:
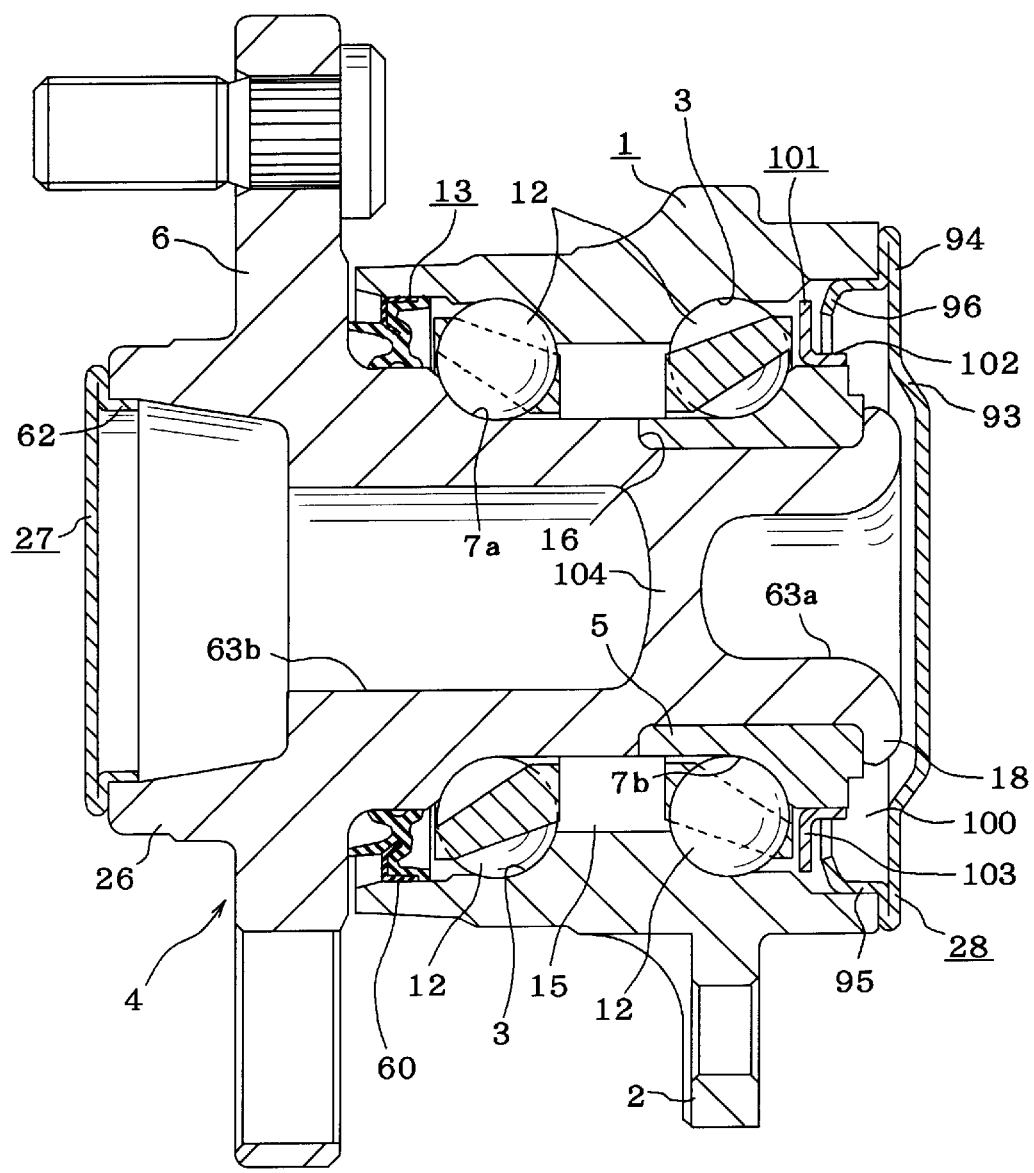
FIG. 12 is a cross sectional view of a seventh example of the embodiments of the rolling bearing unit for a road wheel according to the present invention.

Next, FIG. 12 shows a seventh embodiment of this invention. This embodiment is different from the sixth embodiment described above in that a slinger 101 is used instead of the cover 97 which acts as a third seal member (see FIG. 11). This slinger 101 is made of sheet metal such as SPCC and is formed by pressing it into an annular shape having an L-shaped cross section.

The cylindrical section 102 of this slinger 101 is fitted tightly around the shoulder portion of the inner ring 5 by way of interference fitting. In this state, the radially outer edge of the circular section 103 of the slinger 101 faces the inner peripheral surface of the axially inner end of the outer ring 1 through a small gap of about 1 mm therebetween.

Also, the axially outer surface of the inward rim 96 of the cover 28 faces the outer peripheral edge on the axially inner surface of the circular section 103 through a small gap of about 1 mm therebetween.

In this embodiment, constructed as described above, since the slinger 101 does not exist in the space between the surface oil the axially inner end of the hub 4 and the axially outer surface of the cover 28, it is possible to shorten the length in the axial direction of the rolling-bearing unit for road wheel in comparison with that of the sixth embodiment described above.

Incidentally, in this embodiment, the slinger 101, which is a third seal member, is separate from and fitted to the inner ring 5, however it is possible to construct the third seal member as part of the inner ring 5 by forming a rim section on part of the outer peripheral surface of the shoulder portion of the inner ring 5, that protrudes in the radial direction all the way around the rim, and that is integral with the inner ring 5.

The other construction and function are substantially the same as that described above for the sixth embodiment, and the same symbols are used for identical parts and redundant explanations are omitted.

Figure 13:
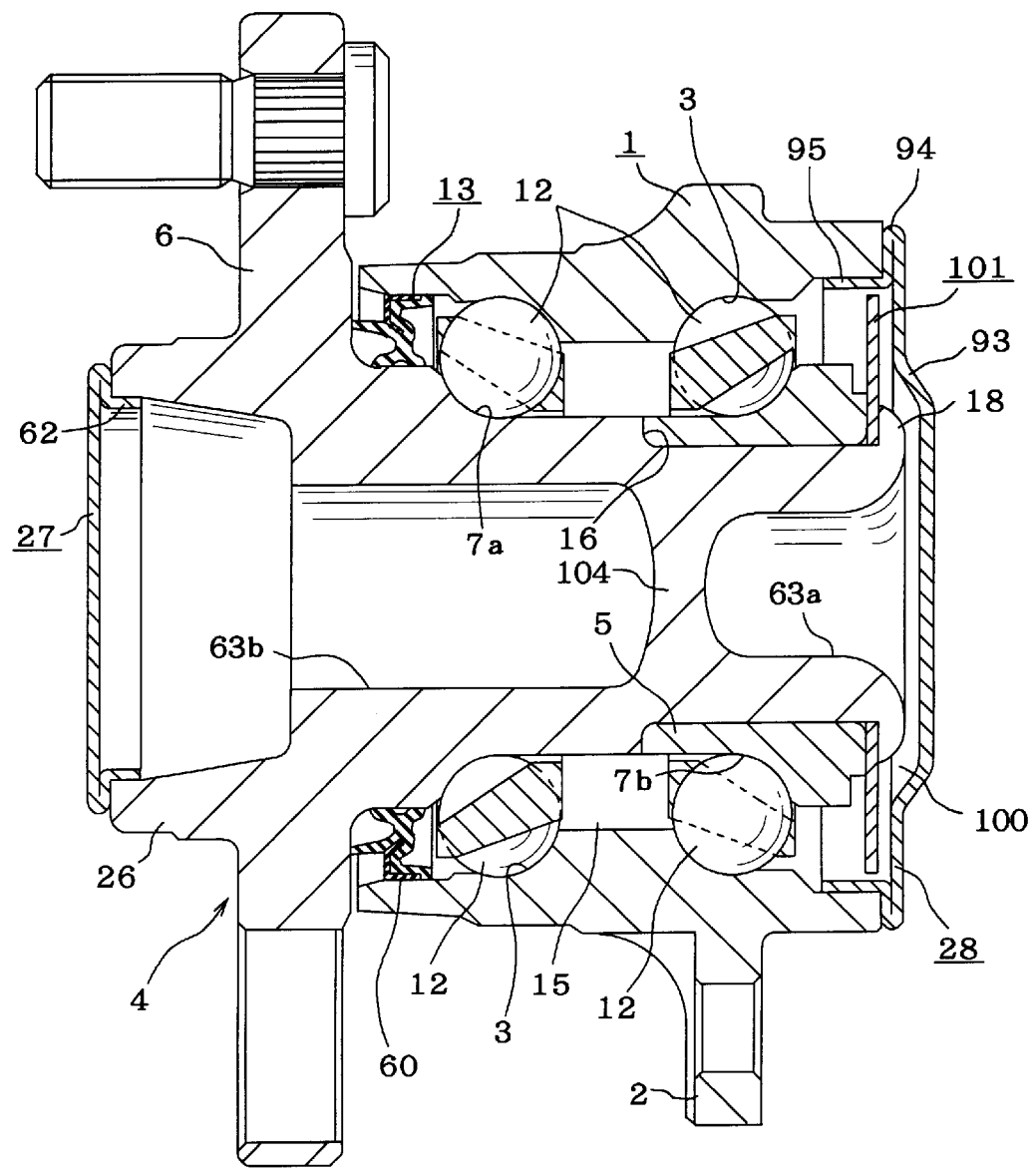
FIG. 13 is a cross sectional view of a eighth example of the embodiments of the rolling bearing unit for a road wheel according to the present invention.

Next, FIG. 13 shows an eighth embodiment of the invention. In this embodiment, a circular ring-shaped slinger 101 made of sheet metal, which is a third seal member, is fastened to the hub 4, by supporting the slinger 101 between the surface on the axially inner end of the inner ring 5 and the crimped section 18 on the axially inner end of the hub 4.

Also, the radially outer edge of the slinger 101 faces the inner peripheral surface of the fitting tube portion 95, that is formed on the cover 28 fitted into the axially inner end of the outer ring 1, through a small gap of about 1 mm therebetween.

Moreover, on the radially inside of the abutting section 94, the axially outer surface of cover 28 faces the outer peripheral portion of the axially inner surface of the slinger 101 through a small gap of about 1 mm therebetween.

Incidentally, in this embodiment, there is no inward rim that protrudes inward in the radial direction formed on the edge of the opening of the cover 28. The other construction and function are substantially the same as that described above for the seventh embodiment, and the same symbols are used for identical parts and redundant explanations are omitted.

Figure 14:
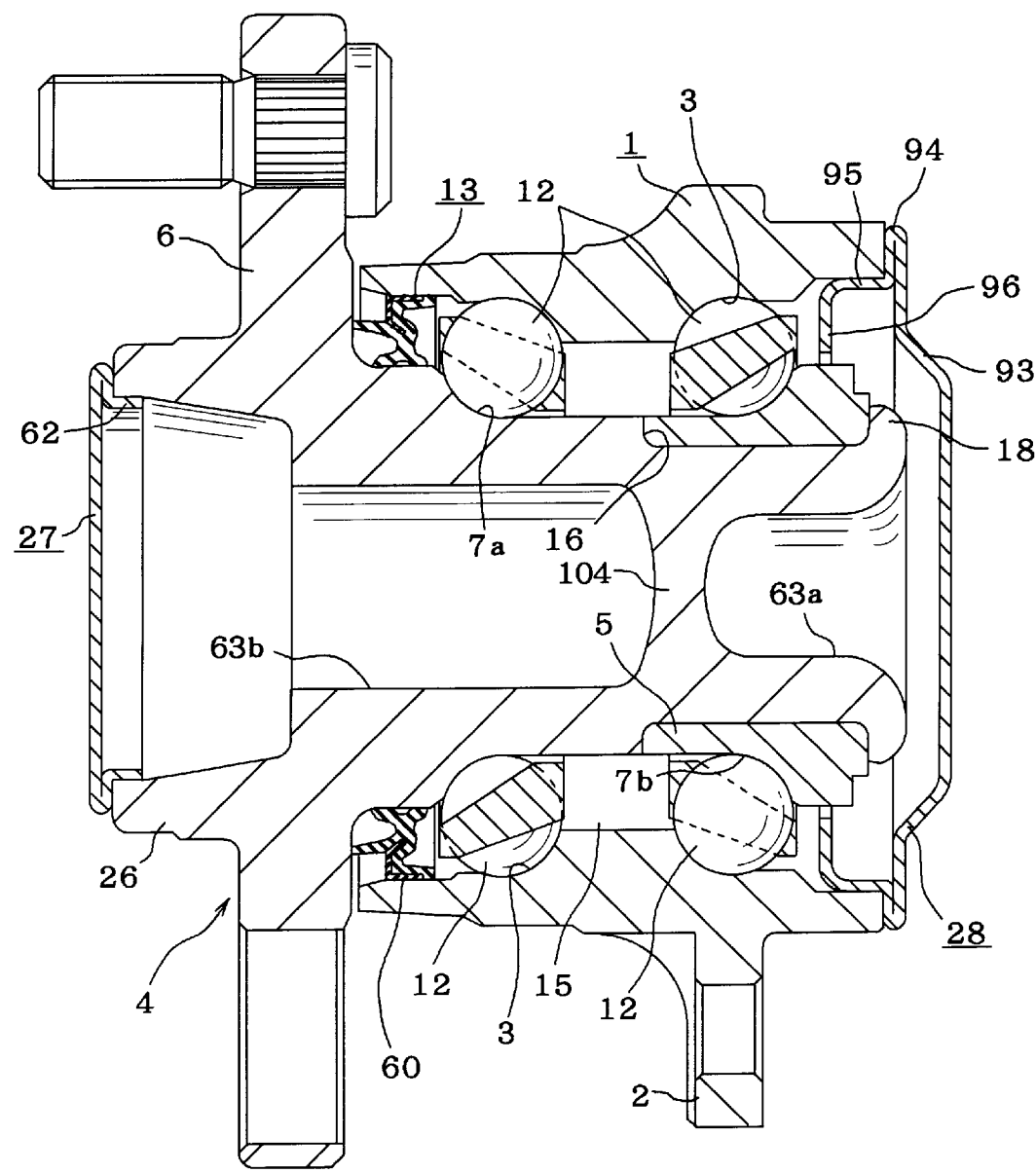
FIG. 14 is a cross sectional view of a ninth example of the embodiments of the rolling bearing unit for a road wheel according to the present invention.

Next, FIG. 14 shows a ninth embodiment of the invention. This embodiment differs from the other embodiments described above in that the first and third seal members are formed by the same member. Specifically, the cover 28 of sheet metal acts as the first and third seal members. Therefore, in this embodiment, the length in the axial direction of the inward rim section 96 formed around the cover 28 is longer than that of the sixth and seventh embodiments shows in FIGS. 11 and 12.

Also, when this cover 28 is fitted into the axially inner end of the outer ring 1, the radially inner edge of the inward rim section 96 faces the outer peripheral surface on the axially inner end of the inner ring 5 through a small gap of about 1 mm therebetween.

In this embodiment, since the first and third seal members are not separate, it is possible to reduce the number of components as well as reduce the weight and cost by that amount.

Moreover, since the small gap formed by the labyrinth seal is formed on the inner diameter side of the space 15, it is difficult for grease in the space 15 to pass through the small gap regardless of the centrifugal force that is applied during operation.

The other construction and function are substantially the same as that described above for the seventh embodiment, and the same symbols are used for identical parts and redundant explanations are omitted.

The rolling-bearing unit for a road wheel of this invention, which is constructed and functions as described above, makes it possible to effectively reduce the weight of the rolling-bearing unit, and reducing the weight of the rolling-bearing unit contributes to improvement in the fuel consumption, comfort and dynamic performance of the automobile. Furthermore, it makes it possible to keep to a minimum the amount of grease filled in the bearing, making it possible to realize an inexpensive but sufficiently durable rolling-bearing unit.

What is claimed is:

1. A rolling bearing unit for a road wheel comprising;

a stationary outer ring with first and second ends having an outer peripheral surface formed with a first installation flange and an inner peripheral surface formed with an outer ring raceway, a rotatable hub with first and second ends having an outer peripheral surface formed with a second installation flange at the second end thereof for supporting the road wheel and an inner ring raceway at an axial middle portion thereof, a plurality of rolling members rotatably provided between the outer ring raceway and the inner ring raceway, a first seal member for providing a shield for the opening at the first end of the outer ring, and a second seal member in a ring shape for providing a shield between the opening portion at the second end of the outer ring and the outer peripheral surface of the axial middle portion of the hub, the hub having a hole section formed to have an opening in the central portion at either end of the hub, thereof a third seal member provided within a space isolated by the first seal member from outside to provide a shield between the opening of the hole section at the first end of the hub and the portion where the rolling members are located between the outer peripheral surface of the hub and the inner peripheral surface of the outer ring, and a fourth seal member for covering the opening of the hole section at the second end of the hub.

2. The rolling bearing unit for road wheel of claim 1, wherein the third seal member forms a labyrinth seal between the opening of the hole section at the first end of the hub and the portion where the rolling members are located between the outer peripheral surface of the hub and the inner peripheral surface of the outer ring.

3. The rolling bearing unit for road wheel of claim 1, wherein the first and third members are made from the same member.

4. The rolling bearing unit for road wheel of one of claims 1 to 3, wherein the inner ring raceway is formed directly on the hub.

5. The rolling bearing unit for road wheel of one of claims 1 to 3, wherein the hub has an inner ring fitted thereon with the inner ring raceway formed on the inner ring.

6. The rolling bearing unit for road wheel of claim 2, wherein the first and third members are made from the same member.

7. The rolling bearing unit for road wheel of claim 6, wherein the inner ring raceway is formed directly on the hub.

8. The rolling bearing unit for road wheel of claim 6, wherein the hub has an inner ring fitted thereon with the inner ring raceway formed on the inner ring.

\* \* \* \* \*